United States Patent
Okamoto et al.

(10) Patent No.: US 12,242,178 B2
(45) Date of Patent: Mar. 4, 2025

(54) PROJECTION APPARATUS, PROJECTION METHOD, AND COMPUTER-READABLE STORAGE MEDIUM

(71) Applicant: JVCKENWOOD Corporation, Yokohama (JP)

(72) Inventors: Naoya Okamoto, Yokohama (JP); Ryosuke Nakagoshi, Yokohama (JP); Shinji Kikuma, Yokohama (JP); Shigeru Maruyama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 399 days.

(21) Appl. No.: 17/951,157

(22) Filed: Sep. 23, 2022

(65) Prior Publication Data

US 2023/0020363 A1    Jan. 19, 2023

Related U.S. Application Data

(63) Continuation of application No. PCT/JP2021/026781, filed on Jul. 16, 2021.

(30) Foreign Application Priority Data

Nov. 11, 2020    (JP) .................. 2020-188049

(51) Int. Cl.
  *G03B 21/20*    (2006.01)
  *H04N 9/31*    (2006.01)

(52) U.S. Cl.
  CPC ....... *G03B 21/2053* (2013.01); *H04N 9/3155* (2013.01)

(58) Field of Classification Search
  CPC .............. G03B 21/2053; G03B 21/142; H04N 9/3155; H04N 9/3194; H04N 5/202;
  (Continued)

(56) References Cited

U.S. PATENT DOCUMENTS 8,228,351 B2 *   7/2012   Miura .............. H04N 21/4402
                                                      345/600
9,039,200 B2 *   5/2015   Nobori ................... G03B 21/16
                                                       353/97
(Continued)

FOREIGN PATENT DOCUMENTS

JP    2017-181668    10/2017
JP    2017-198733    11/2017
(Continued)

OTHER PUBLICATIONS

International Search Report and Written Opinion for International Application No. PCT/JP2021/026781 mailed on Oct. 12, 2021, 8 pages.

*Primary Examiner* — Magda Cruz
(74) *Attorney, Agent, or Firm* — Amin, Turocy & Watson, LLP

(57) ABSTRACT

A projection apparatus projects an image on a screen based on input data including information on absolute luminance. The projection apparatus includes: a peak luminance value acquisition unit configured to acquire a peak luminance value on the screen when the projection apparatus projects an image on the screen at a maximum output gradation value; a reference luminance value setting unit configured to set a reference luminance value to be higher than the peak luminance value; a relation information setting unit configured to set, based on the reference and peak luminance values, relation information indicating a relation between an output gradation value and a light output value for displaying an output image; an output gradation value setting unit configured to set an output gradation value based on the input data and the relation information; and an output control unit configured to output an image based on the output gradation value.

7 Claims, 9 Drawing Sheets

(58) Field of Classification Search
CPC ......... H04N 9/3182; G09G 2320/0626; G09G 2320/0673; G09G 2320/08; G09G 5/10; G09G 2340/045
USPC .......................................................... 353/85
See application file for complete search history.

(56) References Cited

U.S. PATENT DOCUMENTS

2017/0289508 A1* 10/2017 Fujioka ................ H04N 9/3194
2017/0310938 A1   10/2017 Okamura

FOREIGN PATENT DOCUMENTS

JP    2017-200104    11/2017
JP    2019-184629    10/2019

* cited by examiner

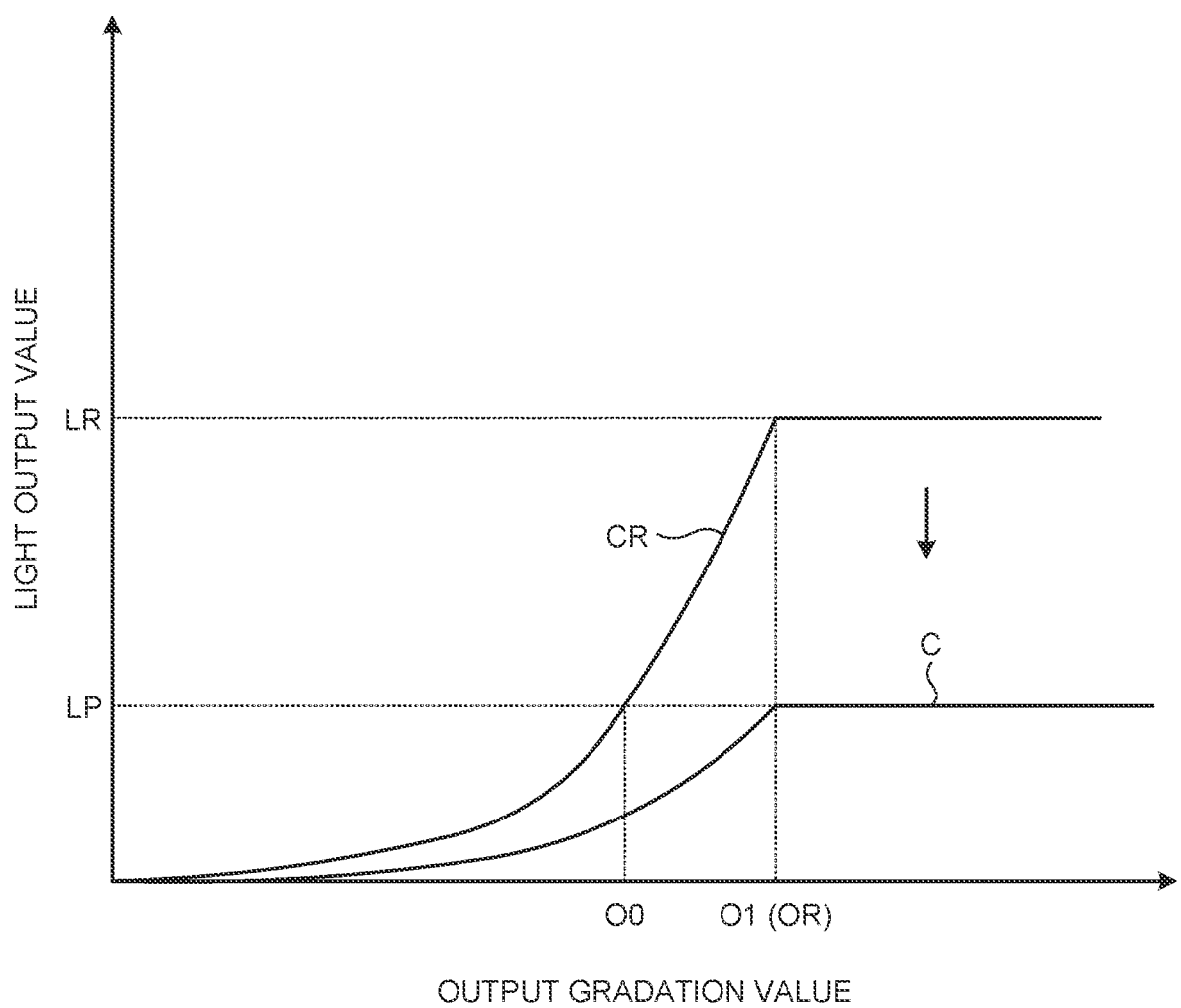

PROJECTION APPARATUS, PROJECTION METHOD, AND COMPUTER-READABLE STORAGE MEDIUM

CROSS-REFERENCE TO RELATED APPLICATIONS

This application is a Continuation of PCT International Application No. PCT/JP2021/026781 filed on Jul. 16, 2021 which claims the benefit of priority from Japanese Patent Application No. 2020-188049 filed on Nov. 11, 2020, the entire contents of both of which are incorporated herein by reference.

BACKGROUND

The present disclosure relates to a projection apparatus, a projection method, and a computer-readable storage medium.

BACKGROUND

For example, as input data to display an image, input data including information on an absolute luminance value such as a high dynamic range (HDR) signal in the perceptual quantization (PQ) format, is input to a projection apparatus. The projection apparatus generates output data such that an image to be projected has the absolute luminance value defined in the input data, and projects the image. However, when an HDR image is projected on a screen, the actual luminance of the image on the screen may change depending on the size of the screen, and may change the appearance of a video image. Therefore, the luminance of the image on the screen may be calculated, and on the basis of the calculated luminance, the electro-optical transfer function (EOTF), that is, the relation between gradation and output luminance may be set. For example, Japanese Patent Application Laid-open No. 2017-198733 discloses a method of changing a gradation conversion process on image data, on the basis of the calculated luminance. Moreover, Japanese Patent Application Laid-open No. 2017-200104 describes a method of changing the EOTF by rewriting EDID of HDR image data, when a plurality of projection apparatuses are disposed in an overlapping manner.

However, for example, in Japanese Patent Application Laid-open No. 2017-198733 and No. 2017-200104, the EOTF is determined according to the luminance required by input data. Therefore, for example, when the luminance on the screen is low or the like, the displayable area according to the PQ curve is reduced, thereby reducing the expressible gradation range. Hence, the image may appear deformed. Moreover, the appearance of a video image may be changed significantly, when the luminance that can be projected by the projection apparatus varies depending on the installation state of the projection apparatus and the state of the main body. Thus, a reduction in change in the appearance of a video image is required, even if the luminance that can be projected by the projection apparatus varies, while suppressing the expressible gradation range from being reduced.

SUMMARY

A projection apparatus according to an aspect of embodiment projects an image on a screen based on input data including information on absolute luminance. The projection apparatus includes: a peak luminance value acquisition unit configured to acquire a peak luminance value that is a luminance value on the screen when the projection apparatus is set to a predetermined state and when the projection apparatus projects an image on the screen at a maximum output gradation value; a reference luminance value setting unit configured to set a reference luminance value to be higher than the peak luminance value; a relation information setting unit configured to set, based on the reference luminance value and the peak luminance value, relation information indicating a relation between an output gradation value and a light output value that is intensity of light for displaying an output image from the projection apparatus; an output gradation value setting unit configured to set an output gradation value based on the input data and the relation information; and an output control unit configured to output an image based on the output gradation value generated by the output gradation value setting unit.

A projection method according to an aspect of embodiment is for projecting an image on a screen based on input data including information on absolute luminance. The projection method includes: acquiring a peak luminance value that is a luminance value on the screen when a projection apparatus is set to a predetermined state, and when the projection apparatus projects an image on the screen at a maximum output gradation value; setting a reference luminance value to be higher than the peak luminance value; setting, based on the reference luminance value and the peak luminance value, relation information indicating a relation between an output gradation value and a light output value that is intensity of light for displaying an output image from the projection apparatus; setting an output gradation value based on the input data and the relation information; and outputting an image based on the output gradation value.

A non-transitory computer-readable storage medium according to an aspect of embodiment stores a computer program for projecting an image on a screen based on input data including information on absolute luminance. The computer program causes the computer to execute: acquiring a peak luminance value that is a luminance value on the screen when a projection apparatus is set to a predetermined state, and when the projection apparatus projects an image on the screen at a maximum output gradation value; setting a reference luminance value to be higher than the peak luminance value; setting, based on the reference luminance value and the peak luminance value, relation information indicating a relation between an output gradation value and a light output value that is intensity of light for displaying an output image from the projection apparatus; setting an output gradation value based on the input data and the relation information; and outputting an image based on the output gradation value.

BRIEF DESCRIPTION OF THE DRAWINGS

FIG. 5 is a graph illustrating an example of relation information.

DETAILED DESCRIPTION

Hereinafter, the present embodiment will be described in detail with reference to the accompanying drawings. It is to be noted that the present embodiment is not limited to the following examples.

First Embodiment

Figure 1:
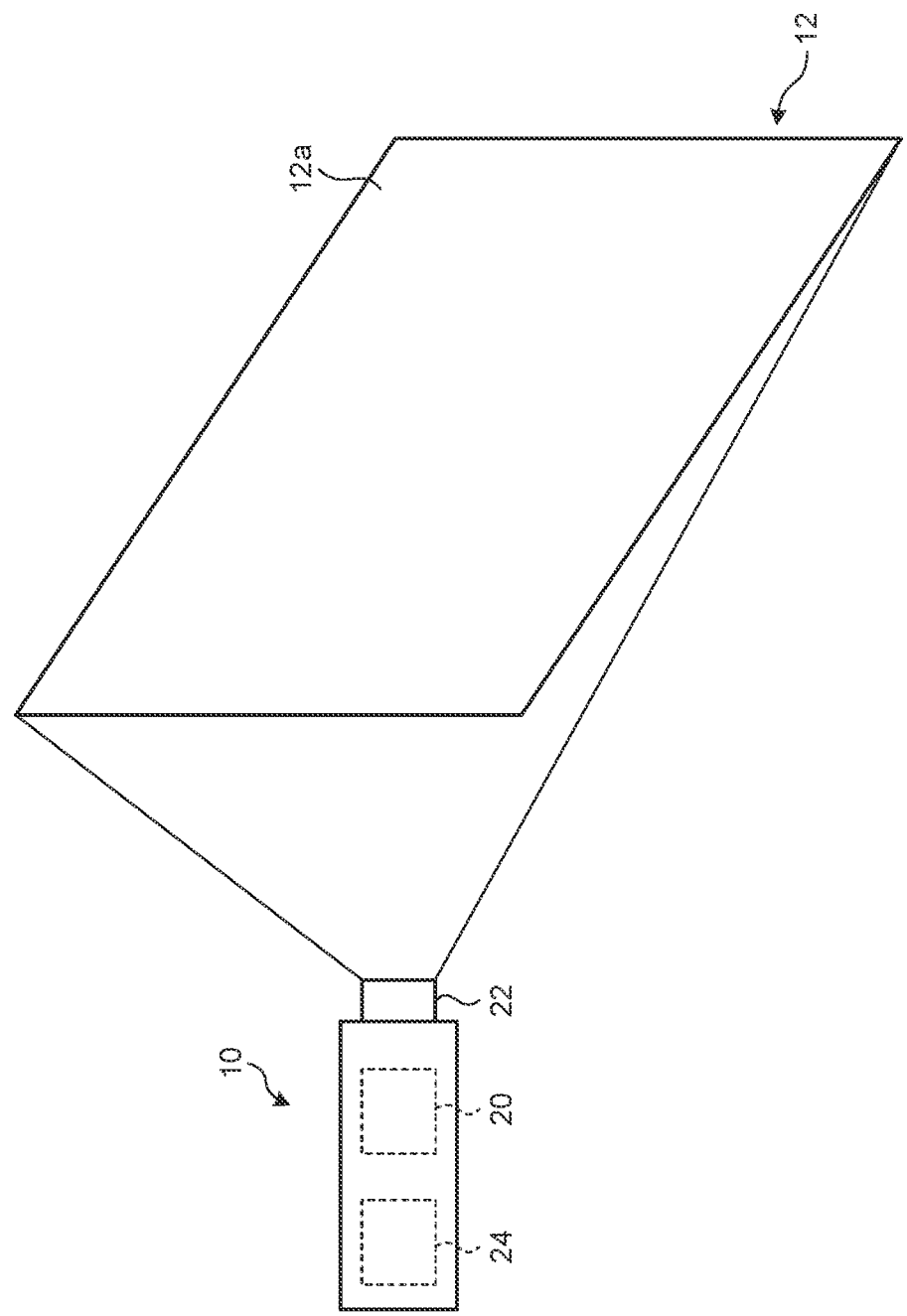
FIG. 1 is a schematic view of a projection system according to a first embodiment.

FIG. 1 is a schematic view of a projection system according to a first embodiment. As illustrated in FIG. 1, a projection system 1 according to the present embodiment includes a projection apparatus 10 and a screen 12.

The projection apparatus 10 is a device for displaying an image, and displays an image on the screen 12 by irradiating the screen 12 with light and projecting light on the screen 12. That is, in the present embodiment, the projection apparatus 10 is a projector that projects an image. The projection apparatus 10 acquires input data including information on an absolute luminance value, and outputs light (image) by setting an output gradation value that can output an image with an absolute luminance value corresponding to the absolute luminance value indicated by the input data. That is, the projection apparatus 10 displays an image in the high dynamic range (HDR) format. More specifically, the projection apparatus 10 is preferably a projection apparatus based on the Perceptual Quantization (PQ) format.

The projection apparatus 10 includes a light source 20, an optical system 22, and a control device 24. The light source 20 is a light source that generates light emitted from the projection apparatus 10, and may have any configuration. The optical system 22 is an optical element that receives light output from the light source 20, and emits the light to the outside. For example, the optical system 22 includes a projection lens, an illumination optical system that guides the light from the light source 20 to the projection lens, and a display element. The illumination optical system may have any configuration, and for example, may include a fly-eye lens, a prism, and the like. For example, the display element may be a liquid crystal display element. The control device 24 is a device that controls the emission of light from the projection apparatus 10. The control device 24 will be described below.

The screen 12 is a screen (image display surface) on which an image (light) from the projection apparatus 10 is projected, and that displays the projected image. In the example illustrated in FIG. 1, the screen 12 displays an image on a projection surface 12a, when the projection surface 12a, which is on the front surface side, is irradiated with the light (image) from the projection apparatus 10, and when the light is reflected by the projection surface 12a. However, for example, the screen 12 may be a transmissive screen that displays an image on the projection surface 12a, when the rear surface side is irradiated with the light and the light is transmitted from the rear surface side to the projection surface 12a side. Moreover, in the example of FIG. 1, the screen 12 is formed in a flat shape. However, the screen 12 is not limited to a flat shape and may be formed in any shape. For example, the screen 12 may also be a cylindrical screen in which one of the rear surface side and the front surface side is formed in a concave shape, and the other side is formed in a convex shape.

Control Device

Figure 2:
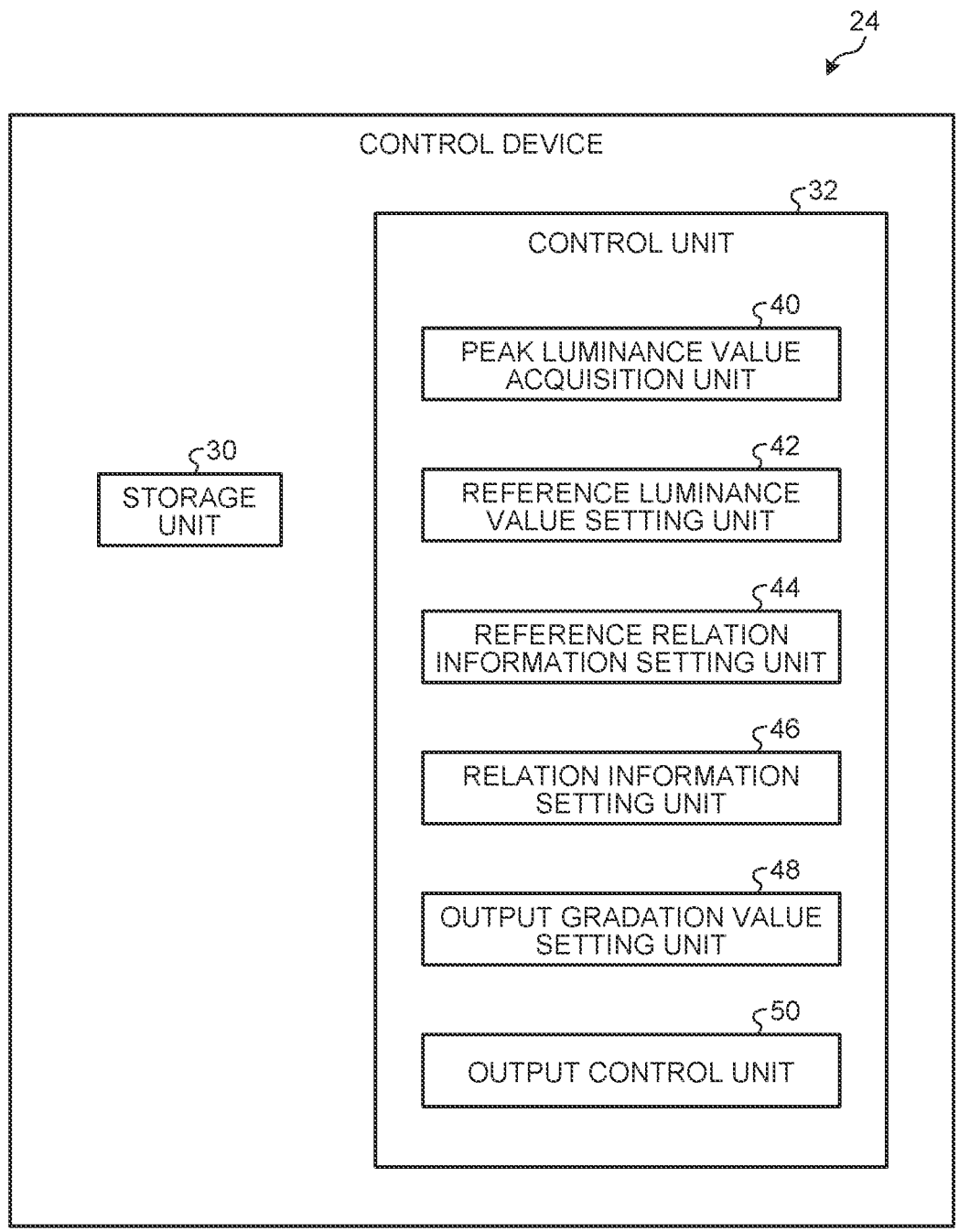
FIG. 2 is a schematic block diagram of a control device of a projection apparatus according to the present embodiment.

FIG. 2 is a schematic block diagram of a control device of a projection apparatus according to the present embodiment. As illustrated in FIG. 2, the control device 24 is a computer in the present embodiment, and includes a storage unit 30 and a control unit 32. For example, the control device 24 may also include an input unit that is a device for receiving an operation by a user such as a touch panel, an output unit that outputs information such as a display, and a communication unit that is a communication module such as an antenna. The storage unit 30 is a memory that stores various types of information such as operation contents and programs of the control unit 32. For example, the storage unit 30 includes at least one of a main storage device such as a random access memory (RAM) and a read only memory (ROM), and an external storage device such as a hard disk drive (HDD). The program for the control unit 32 stored in the storage unit 30 may also be stored in a recording medium that can be read by the control device 24.

The control unit 32 is an arithmetic device, that is, a central processing unit (CPU). The control unit 32 acquires input data for causing the projection apparatus 10 to display an image, generates an output gradation value for causing the projection apparatus 10 to project (output) an image on the basis of the input data, and causes the projection apparatus 10 to output light (image) at the output gradation value. The input data is image data indicating how the projection apparatus 10 display an image. The input data may also be referred to as an input gradation value. The input data also includes information on an input luminance value that is the absolute luminance value of an image to be displayed on the projection apparatus 10. For example, the input data is an HDR signal. However, the input data may also be image data in any format. The output gradation value is output data used to actually output an image by the projection apparatus 10. In other words, the projection apparatus 10 projects light at the output gradation value. The control unit 32 sets relation information that indicates the relation between an output gradation value and a light output value, sets the output gradation value based on the input luminance value and the relation information, and causes the projection apparatus 10 to output light (image) at the output gradation value. The light output value refers to the intensity of the light output from the projection apparatus 10 (intensity of light for displaying an output image). The relation information may also be referred to as the electro-optical transfer function (EOTF). For example, if a display is used instead of the projection apparatus, the light output value corresponds to the absolute luminance value of an output image. Hereinafter, a specific configuration and processing contents of the control unit 32 will be described.

The control unit 32 includes a peak luminance value acquisition unit 40, a reference luminance value setting unit 42, a reference relation information setting unit 44, a relation information setting unit 46, an output gradation value setting unit 48, and an output control unit 50. The control unit 32 implements the peak luminance value acquisition unit 40, the reference luminance value setting unit 42, the reference relation information setting unit 44, the relation information setting unit 46, the output gradation value setting unit 48, and the output control unit 50 by reading a program (software) from the storage unit 30, and executing the processing of the peak luminance value acquisition unit 40, the reference luminance value setting unit 42, the reference relation information setting unit 44, the relation information setting unit 46, the output gradation value setting unit 48, and the output control unit 50. The control unit 32 may execute the processing with a single CPU, or the control unit 32 may include a plurality of the CPUs and execute the processing with the CPUs. Moreover, at least a part of the peak luminance value acquisition unit 40, the reference luminance value setting unit 42, the reference relation information setting unit 44, the relation information setting unit 46, the output gradation value setting unit 48, and the output control unit 50 may be implemented by hardware.

Peak Luminance Value Acquisition Unit

The peak luminance value acquisition unit 40 acquires a peak luminance value on the projection surface 12a of the screen 12. The peak luminance value is a luminance value of an image projected on the screen, when the projection apparatus 10 is set to a predetermined state and when the projection apparatus 10 projects the image on the screen 12 at the maximum output gradation value. That is, the peak luminance value is the maximum absolute luminance value of light that can be projected on the screen 12 by the projection apparatus 10 set to a predetermined state, and may be referred to as the absolute luminance value of the light when the light is projected on the screen 12 at the maximum output gradation value. The predetermined state is a state in which the irradiation condition of the projection apparatus 10 is set to a predetermined condition. For example, the irradiation condition may be at least one of the maximum amount of luminous flux that can be output by the projection apparatus 10, light source output information (such as the brightness of the light source 20 and usage time of the light source), the state of a movable optical filter (such as information on the wavelength of light transmitted by the optical filter), the diaphragm position of an aperture disposed in the illumination optical system, the diaphragm position of an aperture disposed in the projection lens, the zoom position of the projection lens, settings related to video processing, and the transmittance of each optical component.

In the present embodiment, the peak luminance value acquisition unit 40 acquires a peak luminance value when the projection condition of the projection apparatus 10 is in the current condition. That is, the peak luminance value acquisition unit 40 acquires the luminance value of an image projected on the screen, when the projection apparatus 10 is set to the current state and the image is projected on the screen 12 at the maximum output gradation value, as the peak luminance value. However, it not limited thereto, and the peak luminance value acquisition unit 40 may also acquire the luminance value of an image projected on the screen, when the projection apparatus 10 is set to a state different from the current state and the image is projected on the screen 12 at the maximum output gradation value, as the peak luminance value.

In the present embodiment, the peak luminance value acquisition unit 40 calculates the peak luminance value, on the basis of the screen information and the amount of luminous flux from the projection apparatus 10. The screen information is information related to the screen 12. The screen information includes the size of an image projected on the screen 12, and screen gain. The size of a projected image is information indicating the size of the projected image, and in the present embodiment, is the diagonal length of the projected image. The screen gain refers to the ratio of the luminance of an image projected on the screen 12 with respect to the luminance of an image projected on a standard white plate (complete diffusion plate), when the image is projected on the standard white plate and the screen 12 under the same conditions. The screen gain may be a numerical value that indicates the reflective properties inherent to the fabric of the screen 12. In the present embodiment, the peak luminance value acquisition unit 40 acquires screen information by user input. That is, the user inputs screen information into the input unit of the projection apparatus 10, and the peak luminance value acquisition unit 40 acquires the input screen information. In this case, the projection apparatus 10 may display a menu screen, and the user may input screen information from the menu screen, or the user may input screen information from outside by a communication command or the like. However, the peak luminance value acquisition unit 40 is not limited to acquiring screen information by user input. For example, the peak luminance value acquisition unit 40 may acquire the size of a projected image from the value identified by a distance measurement sensor, a camera, and the like, or may acquire the size of the projected image by identifying the aspect ratio of a projected image from the format of the input video image. Similarly, the peak luminance value acquisition unit 40 may also acquire the screen gain from the luminance of the projected image detected by a photometric sensor or the like. However, if screen information is identified without using the distance measurement sensor, the camera, the photometric sensor or the like, the configuration may be simplified.

The peak luminance value acquisition unit 40 calculates the amount of luminous flux from the projection apparatus 10, on the basis of the projection condition of the projection apparatus 10. That is, the peak luminance value acquisition unit 40 estimates the amount of luminous flux projected from information linked to the brightness that can be identified internally. In the present embodiment, the peak luminance value acquisition unit 40 calculates the amount of luminous flux from the projection apparatus 10, on the basis of the maximum amount of luminous flux that can be output from the projection apparatus 10 and the projection condition of the projection apparatus 10. For example, if the number of projection conditions used for the amount of luminous flux is N, the peak luminance value acquisition unit 40 calculates the amount of luminous flux from the projection apparatus 10, on the basis of the following Equation (1).

$$LM = LM_{MAX} \times (1-D_1) \times (1-D_2) \times \ldots \times (1-D_N) \quad (1)$$

In this example, LM is the amount of luminous flux from the projection apparatus 10, $LM_{MAX}$ is the maximum amount of luminous flux that can be output from the projection apparatus 10, and $D_1$ to $D_N$ refer to the brightness reduction rate with respect to the maximum amount of luminous flux that can be output from the projection apparatus 10 for each projection condition.

$LM_{MAX}$ is a value set in advance. For example, the peak luminance value acquisition unit 40 may acquire the specification value described in a catalog and the like, the product design value, the actual value measured at the factory, or the like, as $LM_{MAX}$. In this case, the value of $LM_{MAX}$ is stored in advance in the storage unit 30. Moreover, $D_1$ to $D_N$ may also be values set in advance, or may be values calculated by the peak luminance value acquisition unit 40. For example, the light source output information as projection conditions may include the brightness setting of the light source 20 (for example, high/medium/low) selected by the user from the menu screen, and usage time of the light source 20. In general, the quantity of light of the light source decreases with usage time. Hence, for example, the peak luminance value acquisition unit 40 may calculate the brightness reduction rate related to the light source output information, using a mathematical expression in which usage time is a variable. Alternatively, the peak luminance value acquisition unit 40 may also calculate the brightness reduction rate related to the light source output information, by including a table of transmittance at each usage time, and referring to the table. Moreover, for example, the peak luminance value acquisition unit 40 may also calculate the brightness reduction rate related to video processing, through the color temperature setting selected by the user from the menu screen (for example, 6500 K), an image quality mode and a color profile to be applied, an internal processing value and a factory adjustment value that are not displayed on the menu screen, or the like. The factory adjustment value may include a correction value (such as RGB gain values) for correcting individual variations of colors of the projected light. Moreover, for example, the transmittance of each optical component generally decreases with usage time. Hence, for example, the peak luminance value acquisition unit 40 may calculate the brightness reduction rate related to the transmittance of each optical component, using a mathematical expression in which usage time is a variable. Alternatively, the peak luminance value acquisition unit 40 may also calculate the brightness reduction rate related to the transmittance of each optical component, by including a table of transmittance at each usage time, and referring to the table.

The peak luminance value acquisition unit 40 calculates the peak luminance value from the screen information and the amount of luminous flux from the projection apparatus 10. In the present embodiment, the peak luminance value acquisition unit 40 calculates the peak luminance value, using the following Equation (2).

$$LP = LM/AR/\pi \times SG \qquad (2)$$

LP (cd/m$^2$) is the peak luminance value, and LM (lm) is the amount of luminous flux from the projection apparatus 10 as described above. AR (m$^2$) is the area of the projected image on the screen 12, and can be calculated from the size of the projected image. In general, the size of the projected video image on the screen 12 is expressed by the length of the diagonal line (in inches). Hence, the area of the projected area can be calculated from the length of the diagonal line. In a case when the unit of the area of the projected area is calculated in m$^2$, the unit is converted from inches to meters as necessary. In addition, $\pi$ is pi, and SG is the screen gain.

As described above, the peak luminance value acquisition unit 40 calculates the peak luminance value from the screen information and the amount of luminous flux from the projection apparatus 10. However, the calculation method of the peak luminance value is not limited thereto, and any method may be used. Moreover, for example, the peak luminance value acquisition unit 40 may also acquire the measured value of the peak luminance value, without calculating the peak luminance value. In this case, for example, an image is projected on the screen 12 at the maximum output gradation value from the projection apparatus 10 set to a predetermined state, and the luminance value on the screen 12 is measured, for example, by a luminance sensor and the like. The peak luminance value acquisition unit 40 acquires the luminance value measured by the luminance sensor as the peak luminance value.

Reference Luminance Value Setting Unit

The reference luminance value setting unit 42 sets a reference luminance value on the basis of the peak luminance value. The reference luminance value refers to the luminance value to be referred to, when the relation information that indicates the relation between the output gradation value and the light output value is set. The reference luminance value setting unit 42 sets the reference luminance value to be higher than the peak luminance value.

In the present embodiment, the reference luminance value setting unit 42 sets the reference luminance value, using the reference luminance information that indicates the relation between the reference luminance value and the peak luminance value. That is, the reference luminance value setting unit 42 extracts the reference luminance value corresponding to the peak luminance value acquired by the peak luminance value acquisition unit 40 in the reference luminance information, and sets the extracted value as the reference luminance value. In the reference luminance information, the reference luminance value is reduced with a decrease in the peak luminance value. That is, for example, the reference luminance value when the peak luminance value is 100 (cd/m$^2$), is lower than the reference luminance value when the peak luminance value is 300 (cd/m$^2$).

Figure 3:
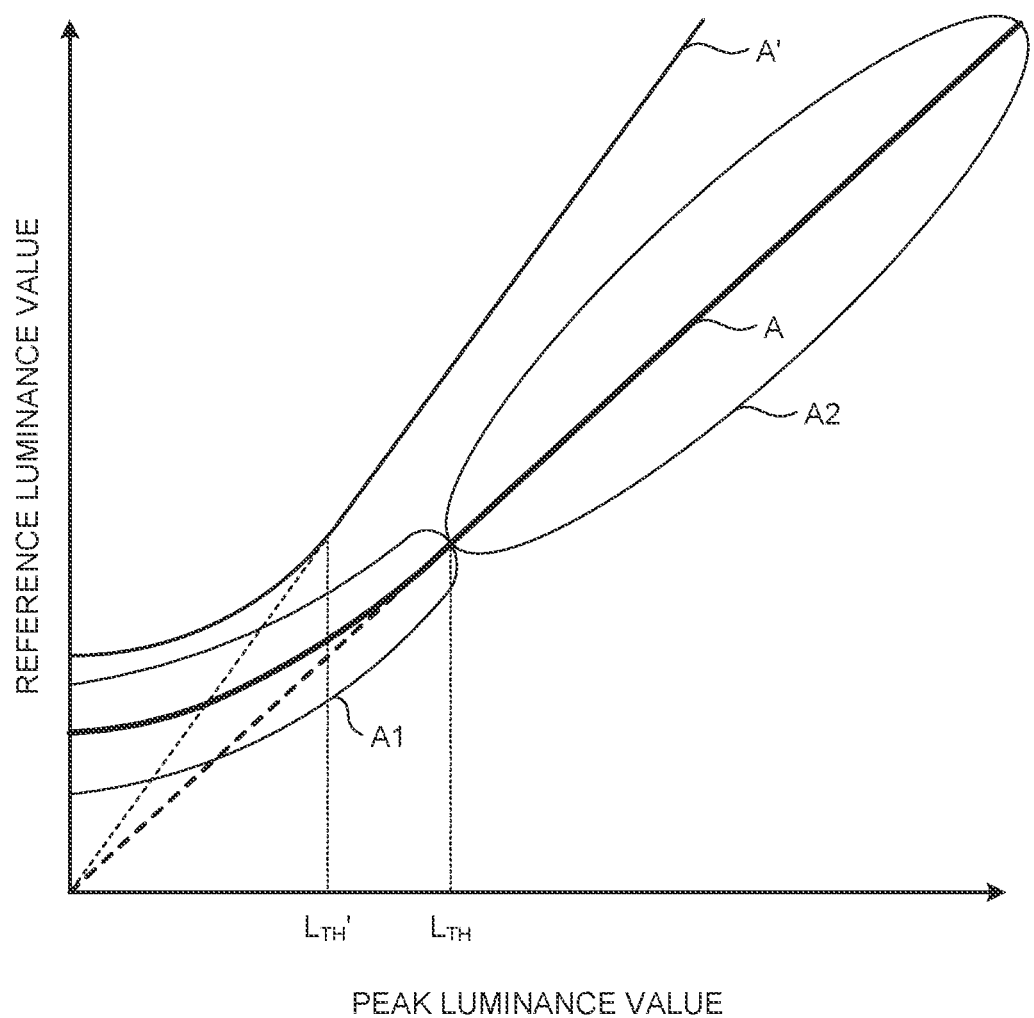
FIG. 3 is a graph illustrating an example of a relation between a reference luminance value and a peak luminance value.

FIG. 3 is a graph illustrating an example of a relation between a reference luminance value and a peak luminance value. As illustrated in FIG. 3, the reference luminance information will be described more specifically, using a curve A representing the reference luminance information. In FIG. 3, the horizontal axis is the peak luminance value and the vertical axis is the reference luminance value. The curve A representing the reference luminance information includes a first section A1 that is a section where the peak luminance value is less than a threshold L$_{TH}$, and a second section A2 that is a section where the peak luminance value is equal to or more than the threshold L$_{TH}$. In the curve A representing the reference luminance information, the inclination in the first section A1 is gentler than that in the second section A2. In other words, in the curve A representing the reference luminance information, the decreased amount of the reference luminance value at the time when the peak luminance value is lower by a unit amount in the first section A1, is lower than the decreased amount of the reference luminance value at the time when the peak luminance value is lower by the unit amount in the second section A2. That is, in the reference luminance information, the inclination in the first section A1 is set small to prevent the reference luminance value from becoming too low, when the peak luminance value is less than the threshold L$_{TH}$ and high luminance cannot be obtained on the screen 12. Consequently, it is possible to appropriately prevent the expressible gradation range from being narrow, when high luminance cannot be obtained on the screen 12.

More specifically, in the curve A representing the reference luminance information, the inclination in the second section A2 is in a straight line. In other words, in the second section A2, the peak luminance value is proportional to the reference luminance value, and the decreased amount of the reference luminance value at the time when the peak luminance value is lower by a unit amount, is constant throughout the entire area of the second section A2. In this manner, by forming the second section A2 in a straight line, when the light output from the projection apparatus 10 is high, it is possible to increase the reference luminance value in proportion to the peak luminance value, and obtain the expressible gradation range and the brightness of the video image to be displayed at the same time. On the other hand, in the curve A representing the reference luminance information, the inclination of the first section A1 is in a curved line, and more specifically, the first section A1 is formed in a curved shape that protrudes downward. In other words, in the first section A1, the decreased amount of the reference luminance value at the time when the peak luminance value is lower by a unit amount, is not constant, and the decreased amount of the reference luminance value at the time when the peak luminance value is lower by the unit amount, is reduced with a decrease in the peak luminance value. In this manner, by forming the first section A1 in a curved line, it is possible to appropriately prevent the expressible gradation range from being narrow, when the light output from the projection apparatus 10 is small and the like.

The relation between the reference luminance value and the peak luminance value in the reference luminance information is not limited to what has been described above. For example, the reference luminance value setting unit 42 may also calculate the reference luminance value using a mathematical expression in which the screen luminance is a variable.

In the present embodiment, the reference luminance information is set in advance, and the reference luminance value setting unit 42 reads the reference luminance information stored in the storage unit 30 and sets the reference luminance value. However, a plurality of pieces of the reference luminance information may be set. In this case, the reference luminance value setting unit 42 may select the reference luminance information to be used from the pieces of reference luminance information. The selection method of the reference luminance information to be used is optional. For example, the user may select the reference luminance information to be used and input the selected reference luminance information into the input unit, and the reference luminance value setting unit 42 may select the reference luminance information input by the user as the reference luminance information to be used. In the example in FIG. 3, two pieces of reference luminance information (curve A with the threshold $L_{TH}$, and curve A' with the threshold $L_{TH}'$) with different relations between the reference luminance value and the peak luminance value are set. However, the shape of the curves A and A' representing the reference luminance information and the number of pieces of reference luminance information are not limited to those illustrated in FIG. 3.

In the above description, the value of the threshold $L_{TH}$ is a fixed value set in advance. However, the threshold $L_{TH}$ may also be a variable value. In this case, by setting the threshold $L_{TH}$, the reference luminance value setting unit 42 may set the reference luminance information. For example, the reference luminance value setting unit 42 sets the threshold $L_{TH}$ on the basis of input data, that is, on the basis of the characteristics of the image. It is preferable that the reference luminance value setting unit 42 increases the threshold $L_{TH}$ with an increase in the input luminance value included in the input data, and reduces the threshold $L_{TH}$ with a decrease in the input luminance value. Consequently, when a bright video image is displayed, the reference luminance value (clip point) is increased to display a video image with good gradation up to the high gradation level of the video image. Moreover, when a dark video image is displayed, because the video image does not have a high gradation, the reference luminance value (clip point) may be reduced. Accordingly, a bright video image close to the input luminance value can be obtained. Furthermore, by setting the reference luminance information using the input luminance value in this manner, it is possible to project a video image with appropriate relation information (EOTF) corresponding to the content, without the user intentionally setting the threshold $L_{TH}$.

When the threshold $L_{TH}$ is set, the reference luminance value setting unit 42 may use the Maximum Content Light Level (MaxCLL) included in the input data, that is, the maximum luminance value of the entire content, as the input luminance value, to set the threshold $L_{TH}$. By using the MaxCLL, it is possible to correspond to the maximum brightness included in the content. For example, the content refers to a group of image data (input data) from the beginning to the end of a single movie. Moreover, when the threshold $L_{TH}$ is set, the reference luminance value setting unit 42 may also use the Maximum Frame Average Light Level (MaxFALL) included in the input data, that is, by using the maximum value of the average luminance value of each frame in the content, as the input luminance value, to set the threshold $L_{TH}$. By using the MaxFALL, it is possible to set the threshold $L_{TH}$ to a preferred value throughout the entire content, corresponding to the maximum average luminance of each frame. Moreover, the MaxCLL or MaxFALL need not be used, and the reference luminance value setting unit 42 may also set the threshold $L_{TH}$ according to the results obtained by performing a video analysis such as histogram. The MaxCLL and MaxFALL are single values of each content. However, by performing the video analysis, it is possible to dynamically change the connection point of each frame and scene, and set more appropriate relation information.

Moreover, when the reference luminance information is set, the reference luminance value setting unit 42 may set a factor other than the threshold $L_{TH}$. For example, the reference luminance value setting unit 42 may set the inclination or intercept of the curve A representing the reference luminance information, or may set all of what has been described above.

Reference Relation Information Setting Unit

Figure 4A:
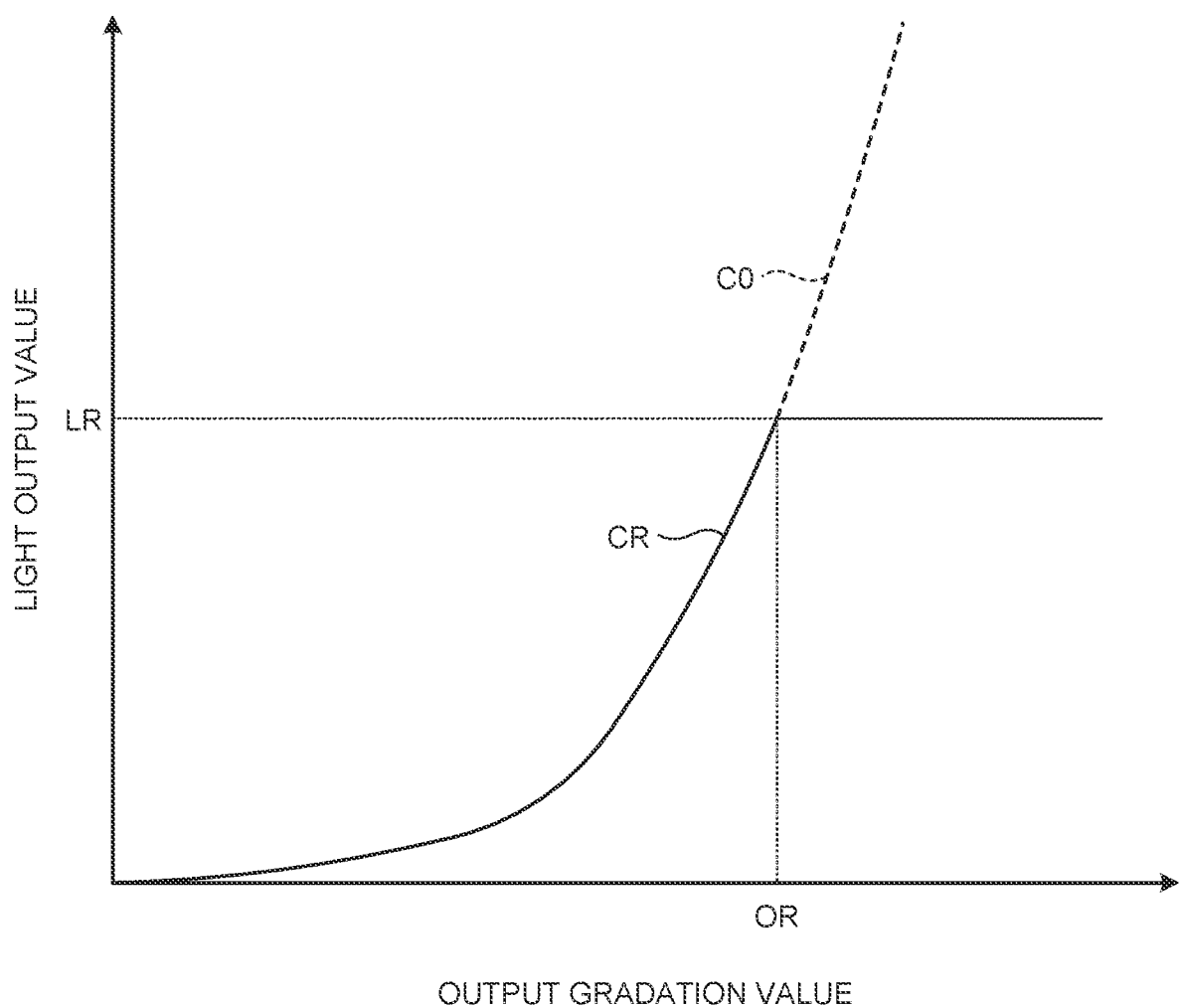
FIG. 4A is a graph illustrating an example of reference relation information.
Figure 4B:
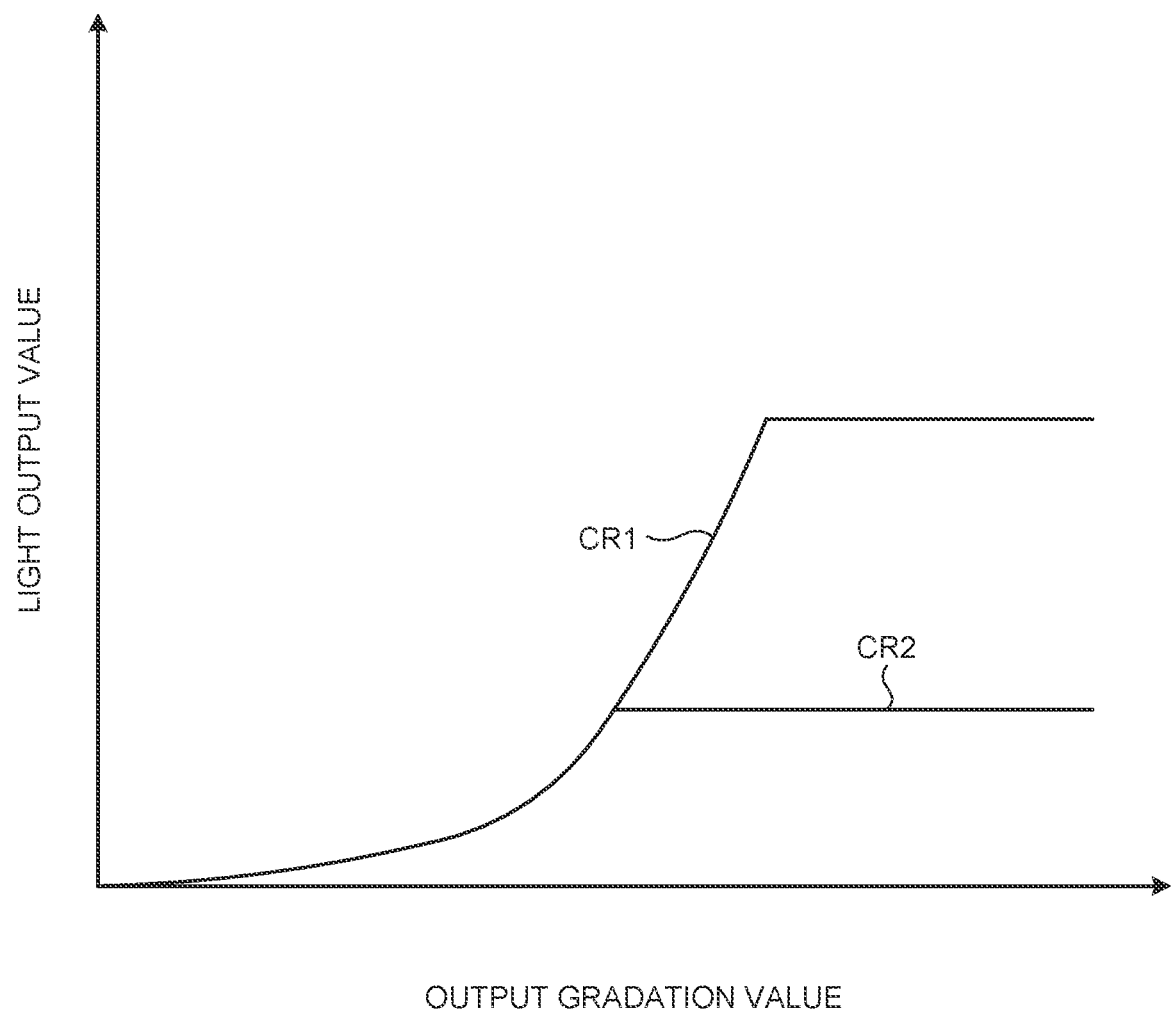
FIG. 4B is a graph illustrating an example of reference relation information.

FIG. 4A and FIG. 4B are graphs each illustrating an example of reference relation information. On the basis of the reference luminance value, the reference relation information setting unit 44 sets reference relation information that indicates the relation between the output gradation value and the light output value. The reference relation information refers to the EOTF used as a reference, when the relation information (EOTF) actually used by the projection apparatus 10 is set. In FIG. 4A, the horizontal axis is the output gradation value and the vertical axis is the light output value. As illustrated in FIG. 4A, if the curve representing the reference luminance relation information is a curve CR and the reference luminance value is LR, the reference relation information setting unit 44 sets the curve CR representing the reference relation information such that the upper limit value of the light output value is the reference luminance value LR. That is, the reference relation information setting unit 44 sets the EOTF in which the reference luminance value LR is the clip point (saturation point), as the curve CR representing the reference relation information. In the present embodiment, the reference relation information setting unit 44 sets a curve in which the reference luminance value is the clip point, as the curve CR representing the reference relation information, with respect to the curve C0 set in advance. In the present embodiment, the curve C0 is what is called a PQ curve, and is a gamma curve in which the maximum light output value is 10000 cd/m2, for example. If the output gradation value is OR in the curve C0, when the light output value is LR, the curve CR representing the reference relation information extends along the curve C0 (PQ curve) in the section where the output gradation value is OR or less, and the curve CR does not extend along the curve C0 (PQ curve) in the section where the output gradation value is OR or more, and the light output value is kept at LR.

FIG. 4B illustrates an example of curves CR1 and CR2 in which the peak luminance values are different from each other. That is, the curve CR2 is the curve CR representing the reference relation information, when the peak luminance is smaller than that of the curve CR1. In this example, the peak luminance value may vary depending on the installation state of the projection apparatus and the state of the main body, and the appearance of a video image may be changed significantly. In contrast, in the present embodiment, as illustrated by the curves CR1 and CR2, the relation between the output gradation value and the light output value is equal in the area from the low gradation to the intermediate gradation. Hence, it is possible to appropriately prevent a change in the appearance of the video image according to the installation state of the projection apparatus and the state of the main body. The curves CR1 and CR2 are each the curve CR of the second section A2 (straight line section) in which the peak luminance value is the threshold $L_{TH}$ or more. However, it is also possible to appropriately prevent the relation difference between the output gradation value and the light output value from increasing in an area from low gradation to intermediate gradation in the first section A1 in which the peak luminance value is less than the threshold $L_{TH}$.

Relation Information Setting Unit

FIG. 5 is a graph illustrating an example of relation information. The relation information setting unit 46 sets the relation information (EOTF) that indicates the relation between the output gradation value and the light output value, on the basis of the reference luminance value and the peak luminance value. In the present embodiment, the relation information setting unit 46 sets the relation information using the reference relation information such that the upper limit value (clip point) of the light output value is the peak luminance value. As illustrated in FIG. 5, if the curve representing the relation information is a curve C and the peak luminance value is LP, the relation information setting unit 46 sets the curve C representing the relation information, by compressing the curve CR representing the reference relation information such that the upper limit value of the light output value is the peak luminance value LP. More specifically, the relation information setting unit 46 sets the curve C representing the relation information, by compressing the curve CR representing the reference relation information such that the upper limit value of the light output value is the peak luminance value LP, and that the light output value is reduced at the same rate on all points. If the output gradation value is O1 in the curve C representing the relation information, when the light output value is LP, in the curve C representing the relation information, the light output value is increased with an increase in the output gradation value in the section where the output gradation value is O1 or less, and the light output value is kept at LP in the section where the output value is O1 or more. That is, in the curve C representing the relation information, the light output value is changed according to the output gradation value, in the section where the output gradation value is O1 or less. Hence, a gradation change can be expressed. Moreover, in the curve C representing the relation information, the inclination in the section where the output gradation value is O1 or less, is gentler than that of the curve CR. In other words, in the section where the output gradation value is O1 or less, the increased amount of the light output value at the time when the output gradation value is increased by a unit amount in the relation information, becomes smaller than the increased amount of the light output value at the time when the output gradation value is increased by the unit amount in the reference relation information. The output gradation value O1 is larger than an output gradation value O0 when the light output value is LP in the PQ curve, and in the present embodiment, is the same value as the output gradation value OR that is the clip point of the curve CR.

Figure 6:
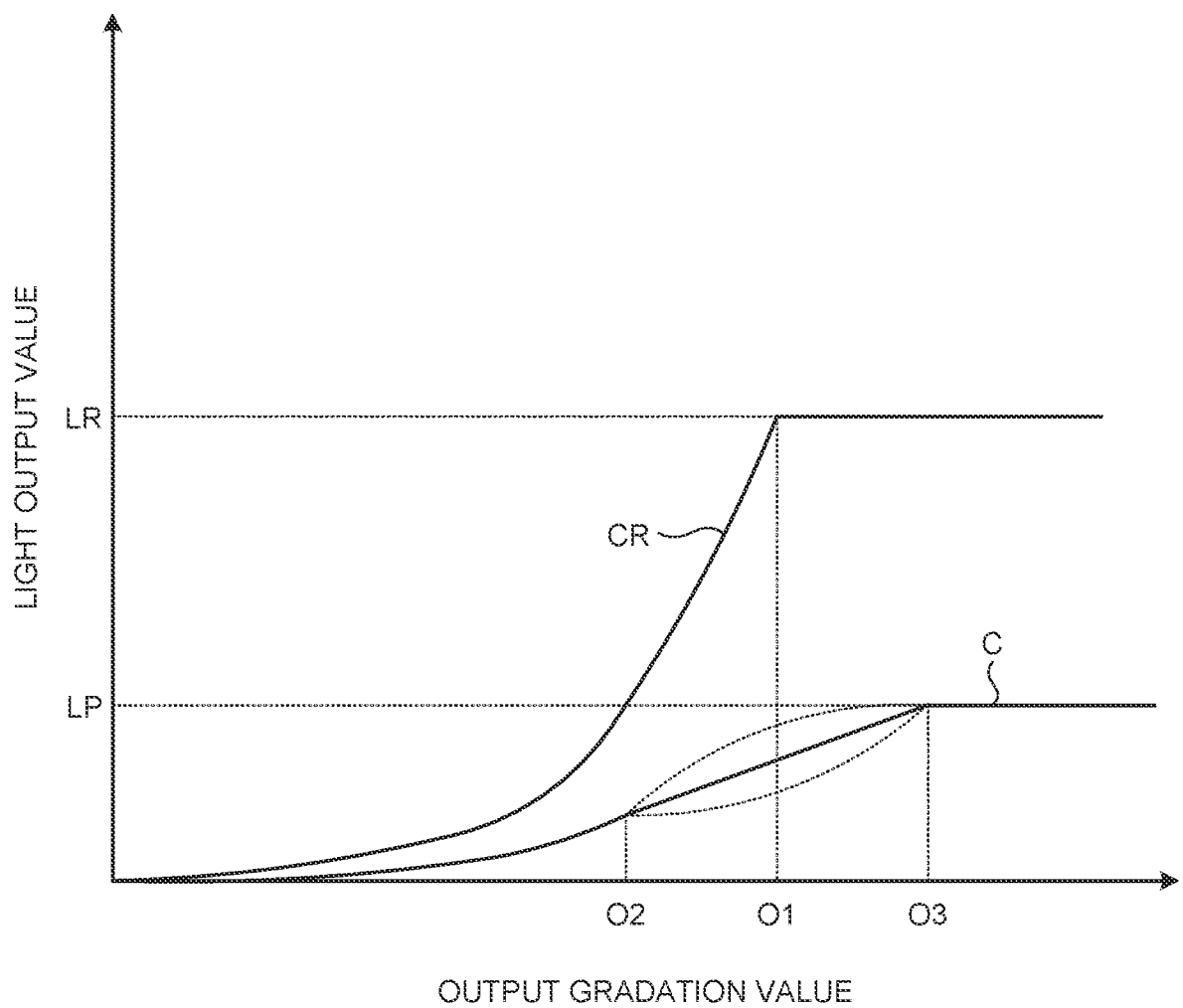
FIG. 6 is a graph illustrating another example of the relation information.

FIG. 6 is a graph illustrating another example of the relation information. The curve C in FIG. 5 is obtained by hard clipping the curve CR representing the reference relation information such that the clip point is the peak luminance value LP. However, as illustrated in FIG. 6, the curve C may also be soft clipped, instead of being hard clipped. In the soft-clipped curve C, the section where the output gradation value is up to O2 that is smaller than O1, has the same curve as that when the curve C is hard clipped. On the other hand, in the soft-clipped curve C, the inclination in the section where the output gradation value is from O2 to O3 that is greater than O1, is gentler than that in the section where the output gradation value is up to O2. Then, in the soft-clipped curve C, the light output value is LP at the output gradation value O3, and the light output value is kept at LP thereafter. In the section where the output gradation value is from O2 to O3, the soft-clipped curve C may be formed in a straight line, in a curved shape that protrudes downward, or in a curved shape that protrudes upward.

Output Gradation Value Setting Unit

The output gradation value setting unit 48 sets the output gradation value on the basis of input data and relation information. The output gradation value setting unit 48 acquires input data, and reads the input luminance value included in the input data. Then, on the basis of the input luminance value, the output gradation value setting unit 48 sets the light output value that is the luminance value to be output. For example, if the input luminance value is equal to or less than the peak luminance value LP, the output gradation value setting unit 48 may determine that the input luminance value can be obtained, and set the same value as the input luminance value as the light output value. If the input luminance value is higher than the peak luminance value LP, the output gradation value setting unit 48 may determine that the input luminance value cannot be obtained, and set the peak luminance value LP as the light output value. The output gradation value setting unit 48 sets the output gradation value, by inputting the light output value to the relation information set by the relation information setting unit 46. That is, the output gradation value setting unit 48 extracts the output gradation value corresponding to the set light output value in the relation information, and sets the extracted output gradation value as the output gradation value.

Output Control Unit

The output control unit 50 controls the units of the projection apparatus 10, and causes the projection apparatus 10 to output light (image) to the screen 12. The output control unit 50 causes the projection apparatus 10 to project light at the output gradation value set by the output gradation value setting unit 48.

Effects

In this example, the PQ curve is set according to the luminance required by input data, for example. However, for example, if the output gradation value is determined according to the PQ curve, when the peak luminance value on the screen is low or the like, the displayable area according to the PQ curve is reduced. Hence the expressible gradation range is reduced, and the image may appear deformed. In contrast, the control device 24 according to the present embodiment sets the reference luminance value to be higher than the peak luminance value, sets the reference relation information in which the reference luminance value is the clip point, sets the relation information by compressing the reference relation information, and sets the output gradation value using the relation information. That is, the control device 24 according to the present embodiment sets the relation information in which the peak luminance value is the clip point, on the basis of the reference luminance value that is higher than the peak luminance value. Therefore, for example, when the relation information is used, the expressible gradation range can be increased compared to the case where the PQ curve is clipped at the peak luminance value. For example, in FIG. 5, the output gradation value O1 in which the curve C representing the relation information is clipped at the peak luminance value LP, is higher than the output gradation value O0 in which the PQ curve is clipped at the peak luminance value LP. Hence, the expressible gradation range is increased in the curve C representing the relation information. In this manner, with the control device 24 according to the present embodiment, it is possible to prevent the expressible gradation range from being reduced. More specifically, by setting the optimal reference luminance value by reflecting the installation state of the projection apparatus and the state of the main body, the control device 24 according to the present embodiment can prevent the expressible gradation range from being narrow, and can obtain brightness at the same time. Moreover, with the control device 24 according to the present embodiment, even when the luminance that can be projected varies depending on the installation state of the projection apparatus or the state of the main body, it is possible to appropriately prevent a change in the appearance of the video image.

Setting Flow of Relation Information

Figure 7:
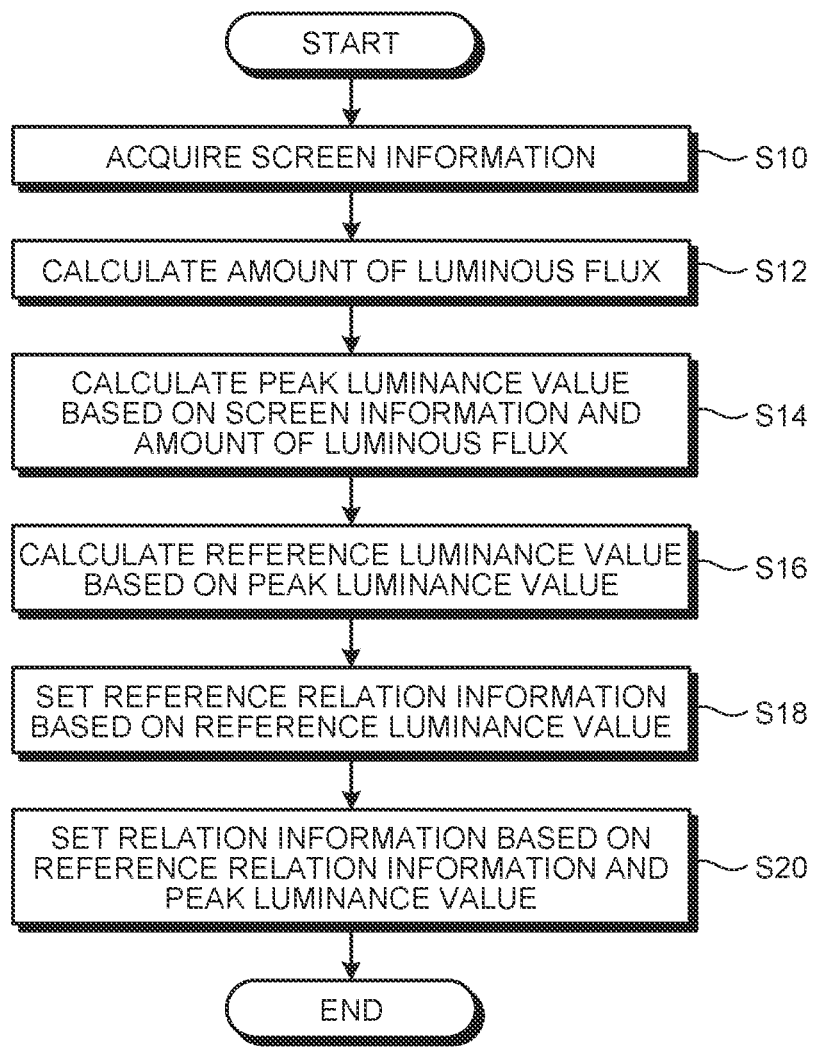
FIG. 7 is a flowchart for explaining the setting flow of relation information.

Next, the setting flow of relation information by the control device 24 will be described on the basis of a flowchart. FIG. 7 is a flowchart for explaining the setting flow of relation information. As illustrated in FIG. 7, the control device 24 acquires screen information through the peak luminance value acquisition unit 40 (step S10), calculates the amount of luminous flux (step S12), and calculates the peak luminance value on the basis of the screen information and the amount of luminous flux (step S14). In the present embodiment, the control device 24 calculates the peak luminance value using Equation (2) described above. Next, the control device 24 sets the reference luminance value on the basis of the peak luminance value through the reference luminance value setting unit 42 (step S16), and sets reference relation information on the basis of the reference luminance value through the reference relation information setting unit 44 (step S18). In the present embodiment, the control device 24 sets the reference luminance value to be higher than the peak luminance value, and sets the reference relation information by clipping the PQ curve at the reference luminance value. Next, the control device 24 sets the relation information on the basis of the peak luminance value and the reference relation information through the relation information setting unit 46 (step S20). In the present embodiment, the control device 24 sets the relation information by compressing the curve CR representing the reference relation information such that the upper limit value of the light output value becomes the peak luminance value LP. The control device 24 sets the output gradation value and projects an image, by using the relation information set at step S20, that is, by using the relation information as the EOTF.

Once the relation information is set, the control device 24 may apply the relation information to the entire input data to output an image. However, the control device 24 may also update the relation information. Hereinafter, an example of a process for updating the relation information will be described.

For example, the control device 24 may update the relation information, when the projection condition of the projection apparatus 10 is changed. In this case, for example, the control device 24 recalculates the peak luminance value on the basis of the changed projection condition. The control device 24 recalculates the reference luminance value, by inputting the recalculated peak luminance value into the curve A (the relation between the peak luminance value and the reference luminance value illustrated in FIG. 3) representing the reference luminance information before the projection condition is changed. The control device 24 updates the relation information, by executing the process subsequent to step S18 using the recalculated reference luminance value. The control device 24 may also calculate the reference luminance value by resetting the reference luminance information itself, in addition to recalculating the reference luminance value using the reference luminance information before the projection condition is changed.

The control device 24 may also update the relation information when the content is updated. In this case, upon acquiring a different content, the control device 24 resets the reference luminance information (the relation between the peak luminance value and the reference luminance value illustrated in FIG. 3) on the basis of the information on the content. For example, the control device 24 updates the reference luminance information by acquiring the MaxCLL and MaxFALL of the content, and resetting the threshold $L_{TH}$ on the basis of the MaxCLL and MaxFALL. Then, the control device 24 recalculates the reference luminance value, by inputting the peak luminance value to the updated reference luminance information. The control device 24 updates the relation information, by executing the process subsequent to step S18 using the recalculated reference luminance value.

The control device 24 may also update the relation information for each input data, that is, for each frame or scene. In this case, the control device 24 sets the reference luminance information (the relation between the peak luminance value and the reference luminance value illustrated in FIG. 3) for each frame. For example, the control device 24 sets the reference luminance information for each frame, by acquiring the maximum input luminance value of each frame, and setting the threshold $L_{TH}$ on the basis of the maximum input luminance value. Then, the control device 24 calculates the reference luminance value of each frame, by inputting the peak luminance value to the reference luminance information. The control device 24 sets the relation information for each frame, by executing the process subsequent to step S18 using the reference luminance value.

As described above, the projection apparatus 10 according to the present embodiment projects an image on the screen 12 on the basis of input data including information on absolute luminance. The projection apparatus 10 includes the peak luminance value acquisition unit 40, the reference luminance value setting unit 42, the relation information setting unit 46, the output gradation value setting unit 48, and the output control unit 50. The peak luminance value acquisition unit 40 acquires the peak luminance value, which is the luminance value on the screen, when the projection apparatus 10 is set to a predetermined state and when the projection apparatus 10 projects an image on the screen 12 at the maximum output gradation value. The reference luminance value setting unit 42 sets the reference luminance value to be higher than the peak luminance value. The relation information setting unit 46 sets the relation information that indicates the relation between the output gradation value and the light output value, which is the absolute luminance of the output image from the projection apparatus 10, on the basis of the reference luminance value and the peak luminance value. The output gradation value setting unit 48 sets the output gradation value on the basis of the input data and relation information. The projection apparatus 10 according to the present embodiment sets the relation information on the basis of the reference luminance value higher than the peak luminance value. Therefore, in the projection apparatus 10 according to the present embodiment, the relation information can prevent the expressible gradation range from being reduced. More specifically, by setting the optimal reference luminance value by reflecting the installation state of the projection apparatus and the state of the main body, the control device 24 according to the present embodiment can prevent the expressible gradation range from being narrow, and can obtain brightness at the same time. Moreover, with the control device 24 according to the present embodiment, even when the luminance that can be projected varies depending on the installation state of the projection apparatus or the state of the main body, it is possible to appropriately prevent the change in the appearance of the video image.

Moreover, the projection apparatus 10 further includes the reference relation information setting unit 44 that sets the reference relation information indicating the relation between the output gradation value and the light output value such that the upper limit value of the light output value is the reference luminance value. By using the reference relation information, the relation information setting unit 46 sets the relation information such that the upper limit value of the light output value is the peak luminance value. The projection apparatus 10 according to the present embodiment sets the relation information, using the reference relation information in which the reference luminance value higher than the peak luminance value is the clip point. Therefore, in the projection apparatus 10 according to the present embodiment, the relation information can prevent the expressible gradation range from being reduced.

Moreover, the reference luminance value setting unit 42 sets the reference luminance value on the basis of the relation between the peak luminance value and the reference luminance value (reference luminance information) that is set such that the reference luminance value is reduced with a decrease in the peak luminance value. The reference luminance information is set such that the decreased amount of the reference luminance value at the time when the peak luminance value is lower by a unit amount, when the peak luminance value is less than the threshold $L_{TH}$, is lower than the decreased amount of the reference luminance value at the time when the peak luminance value is lower by the unit amount, when the peak luminance value is equal to or more than the threshold $L_{TH}$. For example, by setting the reference luminance information in this manner, the projection apparatus 10 according to the present embodiment can appropriately prevent the expressible gradation range from being narrow, when high luminance cannot be obtained on the screen 12.

Second Embodiment

Next, a second embodiment will be described. The second embodiment is different from the first embodiment in that, when the aspect ratio of an image output by the projection apparatus 10 is different from the aspect ratio of a valid projection area where a valid image is projected on the screen 12, the peak luminance value is calculated on the basis of the aspect ratio of the image and the aspect ratio of the valid projection area. In the second embodiment, the description of the portions having the same configuration as that of the first embodiment will be omitted.

Figure 8:
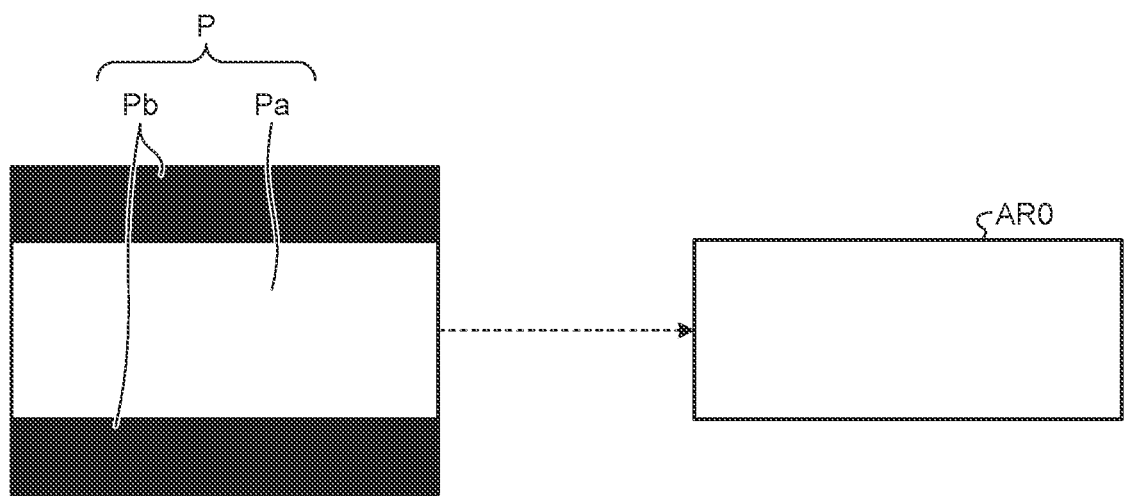
FIG. 8 is a schematic view illustrating an example of a case in which the aspect ratio of an image is different from the aspect ratio of a valid projection area.

FIG. 8 is a schematic view illustrating an example of a case in which the aspect ratio of an image is different from the aspect ratio of a valid projection area. When an image is projected on the screen 12 from the projection apparatus 10, the aspect ratio of an image P output from the projection apparatus 10 may be different from the aspect ratio of a valid projection area AR0 where a valid image is projected on the screen 12. In other words, the projection apparatus 10 may project an image with an aspect ratio different from the designed aspect ratio. For example, the projection apparatus 10 designed to output an image with an aspect ratio of 16:9 in the horizontal/vertical directions may project an image with an aspect ratio of 2.35:1 in the horizontal/vertical directions (CinemaScope size). In such a case, as illustrated in FIG. 8, the projection apparatus 10 outputs the image P including a valid image area Pa and an invalid image area Pb. The valid image area Pa is an area to which an image to be displayed is output. The valid projection area AR0 may be an area on the screen 12 where the valid image area Pa is projected. The invalid image area Pb is an area set above or below the valid image area Pa, and for example, a black image is output. Such an image P may be referred to as a letterbox.

In this manner, when the image P referred to as a letterbox is output, the valid projection area AR0 on the screen 12 is an area with an aspect ratio of 2.35:1 where the valid image area Pa is projected. On the other hand, in the input data, the data has an aspect ratio of 16:9 including the valid image area Pa and the invalid image area Pb. Hence, in the invalid image area Pb also, the light from the light source 20 is output as light not reflected as a valid image (light blocked by the display element). In such a case, if the peak luminance value is calculated using the aspect ratio of the valid projection area AR0, the peak luminance value may be calculated higher than the actual value, as much as the invalid image area Pb is removed. Therefore, if the aspect ratio of the image P output from the projection apparatus 10 is different from the aspect ratio of the valid projection area AR0 on the screen 12, the control device 24 according to the present embodiment calculates the peak luminance value on the basis of the aspect ratio of the image P and the aspect ratio of the valid projection area AR0. Hereinafter, a specific example will be described.

On the basis of the aspect ratio of the image P and the aspect ratio of the valid projection area AR0, the control device 24 calculates the diagonal length of the projected image (size of the projected image) included in the screen information. For example, the control device 24 calculates $L_{device}$ that is the diagonal length of the projected image, using the following Equation (3). By using the calculated $L_{device}$, the control device 24 calculates an area AR of the projected image on the screen 12, as illustrated in Equation (2) described above. In this manner, the control device 24 can calculate the peak luminance value more accurately, by calculating the area AR of the projected image and by calculating the peak luminance value.

$$L_{device}=(AR_{screen}/AR_{device})\times(AR_{device}^2+1)^{0.5}/(AR_{screen}^2+1)^{0.5}\times L_{screen} \quad (3)$$

In this example, $L_{screen}$ is the diagonal length of the valid projection area AR0 on the screen 12, $AR_{screen}$ is the aspect ratio of the valid projection area AR0 of the screen 12, and $AR_{device}$ is the aspect ratio of the image P output from the projection apparatus 10. The information used for calculating $L_{device}$ (such as $L_{screen}$, $AR_{screen}$, and $AR_{device}$) may be measured by various sensors or may be input by the user or the like. Moreover, the control device 24 may also calculate the area AR of the projected image illustrated in Equation (2) described above, by calculating $L_{device}$ by identifying the presence and size of the invalid image area Pb using the video analysis, and by using $L_{device}$.

In the above description, the case in which the aspect ratio of the image P output from the projection apparatus 10 is 16:9 and the aspect ratio of the valid projection area AR0 is 2.35:1 is described as an example. However, even in the case in which the aspect ratio of the image P output from the projection apparatus 10 and the aspect ratio of the valid projection area AR0 are different from 16:9 and 2.35:1, the peak luminance value is similarly calculated on the basis of the aspect ratio of the image P and the aspect ratio of the valid projection area AR0.

Moreover, for example, the projection apparatus 10 may be equipped with an anamorphic lens that optically magnifies the video image in the horizontal direction (longitudinal direction). For example, to project a valid image with an aspect ratio of 2.35:1 on the screen 12, using the projection apparatus 10 designed to output an image with an aspect ratio of 16:9, the projection apparatus 10 may be equipped with an anamorphic lens that magnifies an image by 1.33 times in the horizontal direction. In this case, the V-stretch function for electrically magnifying a video image by 1.33 times in the vertical direction (short direction of the video image) is used. By magnifying the video image in the vertical direction, the invalid image area Pb will be eliminated. In this manner, by optically magnifying an image in the horizontal direction by the anamorphic lens and by electrically magnifying the image in the vertical direction by the V-stretch function, the video image is displayed on the screen 12 at the correct aspect ratio, and it is possible to prevent brightness from being reduced because the invalid image area Pb is eliminated. In such a case, there is no need to calculate $L_{device}$, because the aspect ratio of the image P becomes the same as the aspect ratio of the valid projection area AR0. However, in a case in which the projection apparatus 10 is not designed to output an image with an aspect ratio of 16:9 or the like, if the invalid image area Pb is still present even when a video image is displayed on the screen 12 at the correct aspect, $L_{device}$ may be calculated according to the size of the invalid image area Pb.

Figure 9:
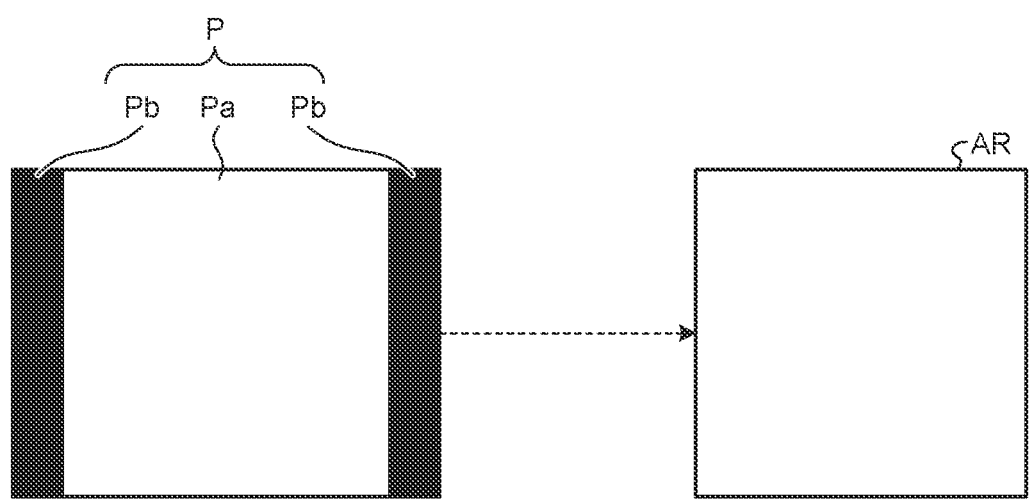
FIG. 9 is a schematic view illustrating an example of a case in which the aspect ratio of an image is different from the aspect ratio of a valid projection area.

FIG. 9 is a schematic view illustrating an example of a case in which the aspect ratio of an image is different from the aspect ratio of a valid projection area. More specifically, when a valid image with an aspect ratio of 16:9 on the screen 12 using the projection apparatus 10 equipped with an anamorphic lens is projected, as illustrated in FIG. 9, the invalid image area Pb needs to be provided on the left and right sides of the valid image area Pa. For example, if an anamorphic lens that magnifies the image by 1.33 times in the horizontal direction is used, the image is electrically reduced by 1.33 times in the horizontal direction. In this case, the invalid image area Pb is the left and right areas where the video image is eliminated due to reduction. In such a case also, the control device 24 calculates $L_{device}$ on the basis of the aspect ratio of the image P and the aspect ratio of the valid projection area AR0. For example, the control device 24 calculates the diagonal length of the projected image, using the following Equation (4).

$$L_{device}=(M_{anamorphic}\times AR_{screen}/AR_{device})\times(AR_{device}^2+1)^{0.5}/\{(M_{anamorphic}\times AR_{screen})^2+1\}^{0.5}\times L_{screen} \quad (4)$$

In this example, $M_{anamorphic}$ is the elongation rate of the anamorphic lens. For $M_{anamorphic}$, the user or the like can input whether the anamorphic lens is used, or the projection apparatus 10 may automatically identify whether the anamorphic lens is attached. In this manner, if the anamorphic lens is used, the control device 24 may calculate $L_{device}$ on the basis of the optical elongation rate by the anamorphic lens and the electrical elongation rate by the V-stretch function, and calculate the area AR of the projected image as illustrated in Equation (2) described above by using $L_{device}$.

Third Embodiment

Next, a third embodiment will be described. The third embodiment is different from the first embodiment in that the reference luminance value setting unit 42 acquires temperature information of a display element included in the projection apparatus, and sets the reference luminance value on the basis of the temperature information also. In the third embodiment, the description of the portions having the same configuration as that of the first embodiment will be omitted. The third embodiment is also applicable to the second embodiment.

When a display element is a liquid crystal or the like, which has a temperature characteristic, the gamma characteristics indicating the response characteristics of gradation may change with temperature. The control device 24 according to the third embodiment acquires the temperature information of the display element by taking into account a change in the gamma characteristics caused by the temperature change in the display device. The control device 24 then sets the reference luminance value on the basis of the temperature information also. That is, in the third embodiment, the reference luminance value is calculated from the peak luminance value in the same way as that in the first embodiment, the calculated peak luminance value is corrected by the temperature information of the display element, and the corrected value is set as the reference luminance value to be actually used.

The acquisition method of the temperature information of the display element is optional. For example, the control device 24 calculates temperature $T_{device}$ that is the temperature of the display element, on the basis of the following Equation (5), and acquires the calculated temperature as the temperature information of the display element.

$$T_{device}=T_{ambient}+Q\times Q_{DA} \quad (5)$$

In this example, $T_{ambient}$ is the ambient temperature of the projection apparatus 10, Q is the heating value of the projection apparatus 10, and $Q_{DA}$ is the thermal resistance between the display element and the ambient temperature. For example, $T_{ambient}$ may be detected by a temperature sensor or the like, or may be a value set in advance. The heating value Q is calculated from the intensity of light with which the display element is irradiated, and the intensity of light with which the display element is irradiated can be obtained from the parameter (projection condition) used to estimate the amount of luminous flux to be projected. For example, the intensity of light with which the display element is irradiated can be calculated using the brightness setting of the light source, an optical filter, an aperture of an illumination optical system, the transmittance of an optical component of an illumination optical system, and the like. The heating value related to driving the display element may be added to the heating value Q. Moreover, the thermal resistance $Q_{DA}$ may be set in advance.

When the display element is a liquid crystal, the display brightness of a video image at the intermediate gradation level generally increases with an increase in the temperature of the display element. Therefore, the control device 24 corrects the reference luminance value such that the value is increased with an increase in the temperature $T_{device}$. Consequently, it is possible to cancel the change in brightness of the video image at the intermediate gradation level caused by temperature, and make the brightness of the video image close to that when there is no change in temperature.

Fourth Embodiment

Next, a fourth embodiment will be described. In the fourth embodiment, the control device 24 adjusts the aperture of the illumination optical system of the projection apparatus such that the F value of the illumination optical system does not exceed the F value of the projection lens. Moreover, the control device 24 of the fourth embodiment adjusts the aperture of the projection lens such that the F value of the projection lens does not exceed the current value. In the fourth embodiment, the description of the portions having the same configuration as that of the first embodiment will be omitted. The fourth embodiment is also applicable to the second embodiment and the third embodiment.

In this example, the F value is changed and the brightness and contrast of the video image are changed, when the zoom position of the projection lens, the aperture of the illumination optical system, or the aperture of the projection lens is moved. The change in brightness of the video image is dominated by one unit with the maximum F value among the units in the projection apparatus 10. For example, if the F value of the projection lens is maximized by the zoom position of the projection lens, influence on the brightness of the video image due to a change in the aperture of the illumination optical system or the aperture of the projection lens is limited. However, if the aperture of the illumination optical system is narrowed and the F value of the aperture of the illumination optical system exceeds the F value of the projection lens, the brightness will be reduced significantly. In this example, the zoom position of the projection lens is determined by the installation conditions. Therefore, to suppress a change in brightness, it is preferable to adjust the aperture of the illumination optical system in a range such that the F value of the illumination optical system does not exceed the F value of the projection lens. In this case, for example, the control device 24 sets the adjustable range of the aperture of the illumination optical system such that the F value of the illumination optical system is in a range that does not exceed the F value of the projection lens. When the user adjusts the aperture of the illumination optical system, the control device 24 notifies the user of the adjustable range of the aperture of the illumination optical system, and encourages the user to adjust the aperture within the adjustable range. Similarly, it is preferable that the control device 24 adjusts the aperture of the projection lens in a range such that the F value of the projection lens does not exceed the current F value of the projection lens. In this case, for example, the control device 24 sets the adjustable range of the aperture of the projection lens such that the F value of the projection lens is in a range not exceeding the current F value of the projection lens. When the user adjusts the aperture of the projection lens, the control device 24 notifies the user of the adjustable range of the aperture of the projection lens, and encourages the user to adjust the aperture within the adjustable range. Consequently, the operation of the aperture of the illumination optical system and the aperture of the projection lens may be able to improve contrast and can obtain a bright video image by suppressing the amount of light from being reduced.

Although the present embodiment has been described above, the embodiment is not limited to the contents of the embodiment described above. Moreover, the components described above include those that can be easily assumed by those skilled in the art, those that are substantially the same, and those that are so-called equivalent ranges. Furthermore, the components described above can be combined as appropriate, and the configuration of each embodiment can also be combined. Still furthermore, various omissions, substitutions, or modifications of the components may be made without departing from the scope of the embodiments described above.

A computer program for performing the projection method described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present embodiment, it is possible to reduce a change in the appearance of a video image even if the luminance that can be projected by the projection apparatus varies, while suppressing the expressible gradation range from being reduced.

For example, the projection apparatus, the projection method, and the program of the present embodiment can be used for displaying an image.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection apparatus that projects an image on a screen based on input data including information on absolute luminance, the projection apparatus comprising:
   a peak luminance value acquisition unit configured to acquire a peak luminance value that is a luminance value on the screen when the projection apparatus is set to a predetermined state and when the projection apparatus projects an image on the screen at a maximum output gradation value;
   a reference luminance value setting unit configured to set a reference luminance value to be higher than the peak luminance value;
   a relation information setting unit configured to set, based on the reference luminance value and the peak luminance value, relation information indicating a relation between an output gradation value and a light output value that is intensity of light for displaying an output image from the projection apparatus;

an output gradation value setting unit configured to set an output gradation value based on the input data and the relation information; and an output control unit configured to output an image based on the output gradation value generated by the output gradation value setting unit.

2. The projection apparatus according to claim 1, further comprising a reference relation information setting unit configured to set reference relation information indicating a relation between the output gradation value and the light output value such that an upper limit value of the light output value is the reference luminance value, wherein the relation information setting unit is configured to set the relation information by using the reference relation information and such that an upper limit value of the light output value is the peak luminance value.

3. The projection apparatus according to claim 1, wherein the reference luminance value setting unit is configured to set the reference luminance value based on a relation between the peak luminance value and the reference luminance value in which the reference luminance value is reduced with a decrease in the peak luminance value, and the relation between the peak luminance value and the reference luminance value is set such that a decreased amount of the reference luminance value at a time when the peak luminance value is lower by a unit amount for the peak luminance value being less than a threshold is lower than the decreased amount for the peak luminance value being equal to or more than the threshold.

4. The projection apparatus according to claim 1, wherein in a case where an aspect ratio of an image output by the projection apparatus is different from an aspect ratio of a valid projection area where a valid image is projected on the screen, the peak luminance value acquisition unit is configured to calculate the peak luminance value based on the aspect ratio of the image and the aspect ratio of the valid projection area.

5. The projection apparatus according to claim 1, wherein the reference luminance value setting unit is configured to acquire temperature information of a display element included in the projection apparatus, and set the reference luminance value based on the temperature information.

6. A projection method for projecting an image on a screen based on input data including information on absolute luminance, the projection method comprising:

acquiring a peak luminance value that is a luminance value on the screen when a projection apparatus is set to a predetermined state, and when the projection apparatus projects an image on the screen at a maximum output gradation value;

setting a reference luminance value to be higher than the peak luminance value;

setting, based on the reference luminance value and the peak luminance value, relation information indicating a relation between an output gradation value and a light output value that is intensity of light for displaying an output image from the projection apparatus;

setting an output gradation value based on the input data and the relation information; and outputting an image based on the output gradation value.

7. A non-transitory computer-readable storage medium storing a computer program for projecting an image on a screen based on input data including information on absolute luminance, the computer program causing a computer to execute:

acquiring a peak luminance value that is a luminance value on the screen when a projection apparatus is set to a predetermined state, and when the projection apparatus projects an image on the screen at a maximum output gradation value;

setting a reference luminance value to be higher than the peak luminance value;

setting, based on the reference luminance value and the peak luminance value, relation information indicating a relation between an output gradation value and a light output value that is intensity of light for displaying an output image from the projection apparatus;

setting an output gradation value based on the input data and the relation information; and outputting an image based on the output gradation value.

* * * * *